United States Patent [19]
Howerton et al.

[11] Patent Number: 6,065,593
[45] Date of Patent: May 23, 2000

[54] COMPACT DISK LOCKING DEVICE

[76] Inventors: William Cassiday Howerton, Box 1310, Blanchard, Okla. 73010; Dale Ray Jobe, 1311 N. Morgan Rd., Tuttle, Okla. 73089

[21] Appl. No.: 09/235,897

[22] Filed: Jan. 22, 1999

[51] Int. Cl.[7] .................................................. B65D 85/57
[52] U.S. Cl. ........................................ 206/310; 206/308.2
[58] Field of Search ........................... 206/308.1, 308.2, 206/310, 303, 493

[56] References Cited

U.S. PATENT DOCUMENTS

| | | | |
|---|---|---|---|
| 2,424,553 | 7/1947 | Conti | 206/408 |
| 3,896,929 | 7/1975 | Mills | 206/493 X |
| 3,951,264 | 4/1976 | Heidecker et al. | 206/303 X |
| 4,425,999 | 1/1984 | MacDonald et al. | 206/493 X |
| 4,499,994 | 2/1985 | Rentch | 206/310 X |
| 4,609,105 | 9/1986 | Manes et al. | 206/308.1 X |
| 4,709,813 | 12/1987 | Wildt | 206/308.2 |
| 4,750,618 | 6/1988 | Schubert | 206/308.2 |
| 5,251,750 | 10/1993 | Gelardi et al. . | |
| 5,269,409 | 12/1993 | Brandt et al. | 206/308.1 |
| 5,400,902 | 3/1995 | Kaminski | 206/310 |
| 5,462,158 | 10/1995 | Kramer . | |
| 5,526,926 | 6/1996 | Deja . | |
| 5,626,225 | 5/1997 | Joyce, Jr. . | |
| 5,630,504 | 5/1997 | Fitzsimmons et al. . | |
| 5,651,458 | 7/1997 | Brosmith et al. . | |
| 5,660,274 | 8/1997 | Chien . | |
| 5,685,427 | 11/1997 | Kuitems et al. . | |
| 5,894,924 | 4/1999 | Koch | 206/310 |

*Primary Examiner*—Bryon P. Gehman
*Attorney, Agent, or Firm*—Molly D. McKay

[57] ABSTRACT

A locking device for releasable securing a compact disc to a disc seat provided in a compact disc case. The device has a flat base, a raised circular shoulder located on the base, and a raised button located on the top of the circular shoulder. The device inserts between the bottom of the case and the disc seat so that the base rests against the bottom of the case, the circular shoulder of the device removable inserts into the middle of the central retaining ring, and the button extends upward through the center opening of the central retaining ring. Although a compact disc can be inserted onto the disc seat without the user manually depressing the button, a compact disc can only be removed for the retaining disk seat by first depressing the button. Depressing the button presses the base against the bottom of the case, which flexes downward sufficiently to allow the shoulder of the device to move downward out of the middle of the central retaining ring, thereby unlocking the flexible teeth that comprise the central retaining ring so that a compact disc can be slipped over them.

6 Claims, 4 Drawing Sheets

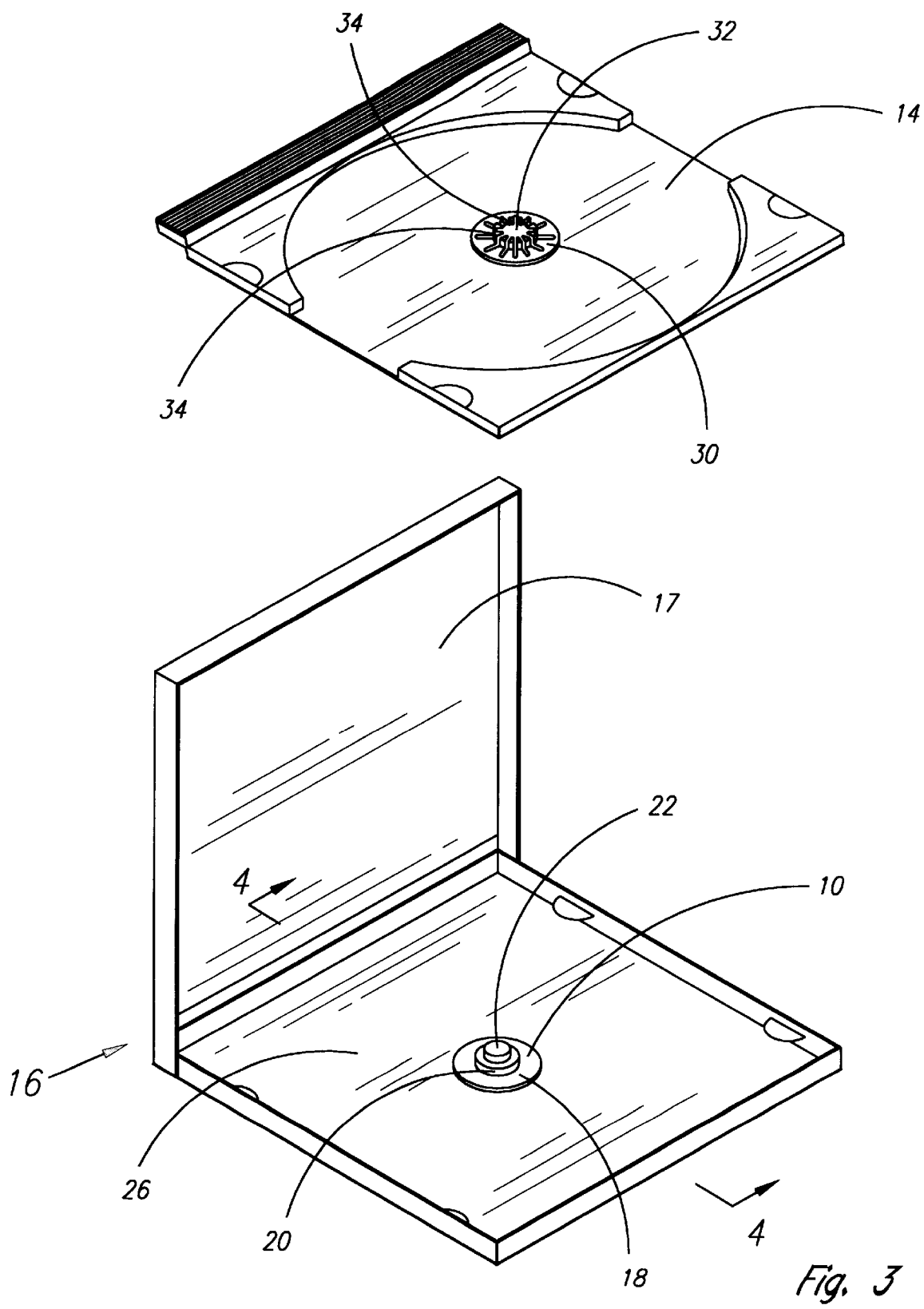

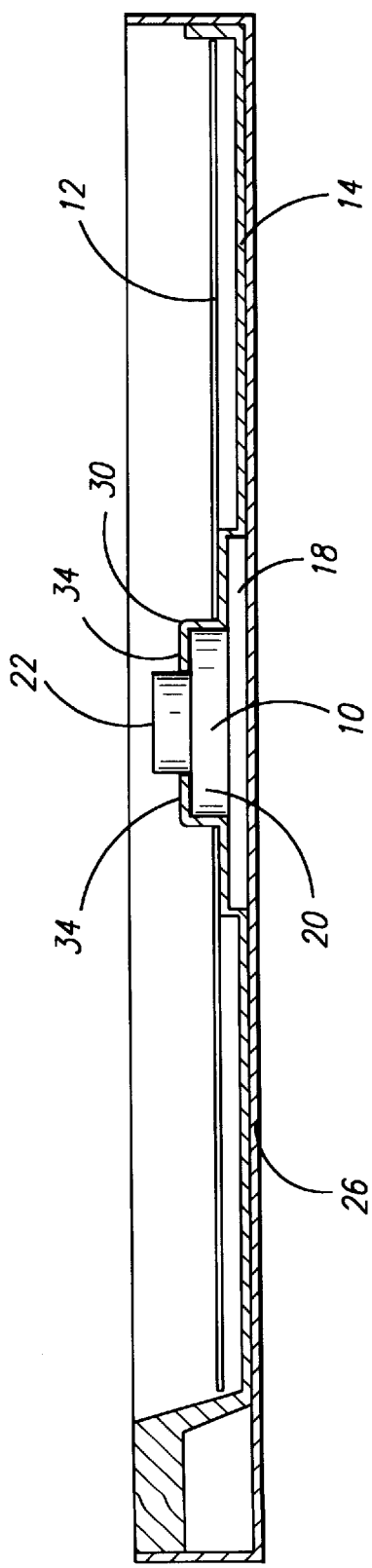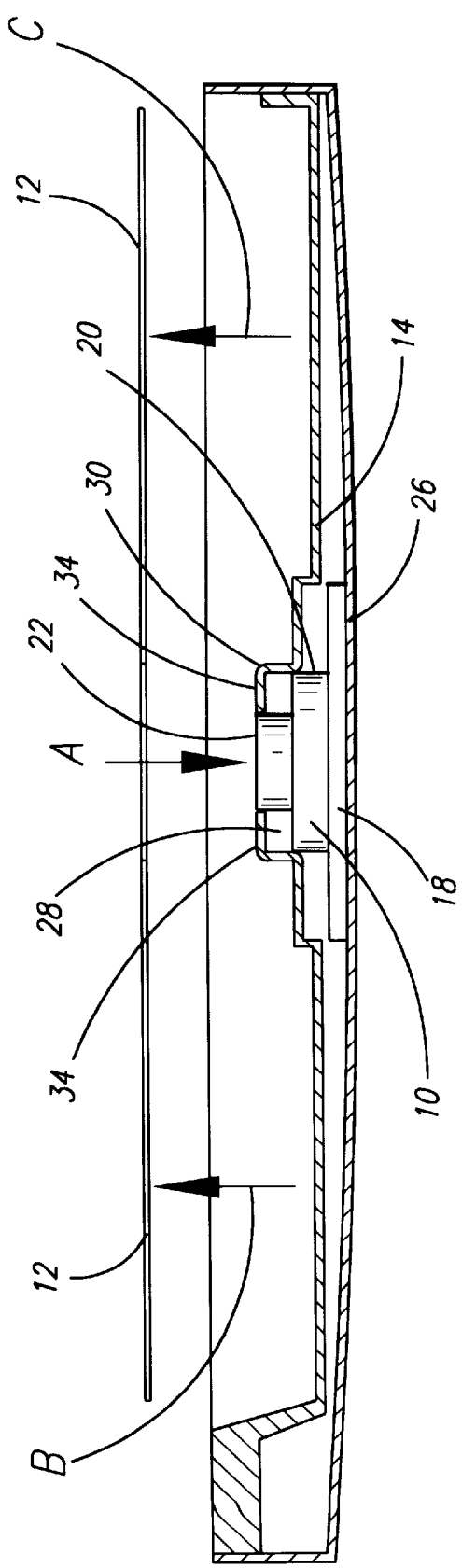

COMPACT DISK LOCKING DEVICE

BACKGROUND OF THE INVENTION

1. Field of the Invention

The present invention relates to a device that inserts into a compact disc case between the bottom of the case and the disc seat that secures a compact disc within the case. The present invention locks the compact disc to the disc seat so that the compact disc will not be accidentally removed from the disc seat.

2. Description of the Related Art

Compact discs are sold to the public and are stored by the consumer in compact disc cases. These compact disc cases are normally constructed of high impact plastic. Compact disc cases are generally of a common design that employs a central retaining ring comprised of a plurality of flexible teeth for retaining a compact disc within the case. This central retaining ring is provided on a disc seat that secures to the bottom of the compact disc case. A hinged top that can be opened and closed is also provided on the compact disc case so that the bottom and top together form the thin compartment that houses the disc seat and any compact disc that might be secured to the disc seat by the central retaining ring.

One of the problems with this common design of compact disc case is that the case can be dropped and the compact disc can be dislodged from the flexible, retaining ring. When dislodged from the case, the compact disc will often be damaged. Also, a compact disc can be damaged when it simply falls out of the case due to excessive wear of the flexible teeth that comprise the central retaining ring. Still another problem with the common design is that small children that are able to reach the case can easily dislodge a compact disc from the flexible central retaining ring. All of these problems stem from the fact that the flexible fingers that comprise the central retaining ring do not securely lock the compact disc to the disc seat.

The present invention addresses the source of these problems by providing a simple means for converting a compact disc case that is constructed according to this common design, into a case in which the compact disc is securely locked to the disc seat by the central retaining ring. A further object of the present invention is to provide a locking mechanism for a compact disc case that can be easily released by an adult user. Still a further object of the present invention is to provide a simple and inexpensive means for locking a compact disc within a compact disc case constructed according to the most common design.

SUMMARY OF THE INVENTION

The present invention is a locking device for releasable securing a compact disc to a disc seat that is normally found in the most common types of compact disc cases. The device is a one-piece item, having a flat base, a raised circular shoulder, and a raised button on the top of the circular shoulder. The device is placed between the bottom of the case and the disc seat so that the base rests against the bottom of the case. When the device is thus installed, the circular shoulder of the device inserts into the middle of the central retaining ring and the button extends upward through the center opening of the central retaining ring.

The flexible teeth that comprise the central retaining ring must flex inward to allow a compact disc to be inserted onto the central retaining ring or to allow a compact disc to be removed from the central retaining ring. With the circular shoulder of the device inserted into the middle of the central retaining ring, the teeth can not flex inward, and thus, the device effectively locks the central retaining ring. In order to unlock the central retaining ring, the shoulder of the device must be pushed downward sufficiently to allow the teeth to once again flex inward. The button is the means for moving the shoulder of the device downward and thereby unlocking the central retaining ring. By pushing downward on the button, the base pushes against the bottom of the case, causing the case to flex downward sufficiently to allow the shoulder of the device to move downward out of the middle of the central retaining ring. A compact disc can be inserted onto the retaining ring without the user manually depressing the button because the exterior of the retaining ring has a beveled lip on it that lets the hole in the disc start over it. As the user exerts downward pressure on the disc, the disc forces the locking device downward, thus allowing the fingers of the retaining ring to move inward. The inward movement of the fingers allows the disc to move onto the retaining ring in exactly the same manner that it would have moved onto the retaining ring had the button had been manually depressed by the user before attempting to insert the disc onto the retaining ring.

Although a compact disc can be inserted onto the retaining ring without the user manually depressing the button, a compact disc can only be removed for the retaining ring by first depressing the button. As soon as the button is released, the bottom of the case will push the device back into its normal upward position, with the shoulder reinserting within the central retaining ring, thereby re-locking the central retaining ring.

It is almost impossible to remove a compact disc from a central retaining ring that is locked by means of the present invention. Also, because of the position of the button relative to a compact disc secured by the locking device, the locking device is essentially childproof. This is true because it takes a large hand to be able to depress the button while at the same time exerting an upward pulling force on the sides of a compact disc that is secured by the device within a case. However, this simultaneous pushing of the button and pulling on the sides of the compact disc can be done easily by and adult with one of his hands, while he uses the other hand to grasp the outside of the case.

BRIEF DESCRIPTION OF THE DRAWINGS

FIG. 3 is an exploded view of a compact disc case showing use of the device of FIG. 1.

FIG. 4 is a cross sectional view taken along line 4-4 of FIG. 3 as the case and device would appear if the lid were removed from the bottom of the case, the disc seat was secured to the bottom of the case and a compact disc was secured locked to the central retaining ring of the disc seat by virtue of the device being in its locked position.

FIG. 5 is the device and case of FIG. 4, illustrating removal of the compact disc by depressing the button provided on the device in order to move the device to its unlocked position.

DETAILED DESCRIPTION OF THE PREFERRED EMBODIMENT INVENTION

Figure 1:
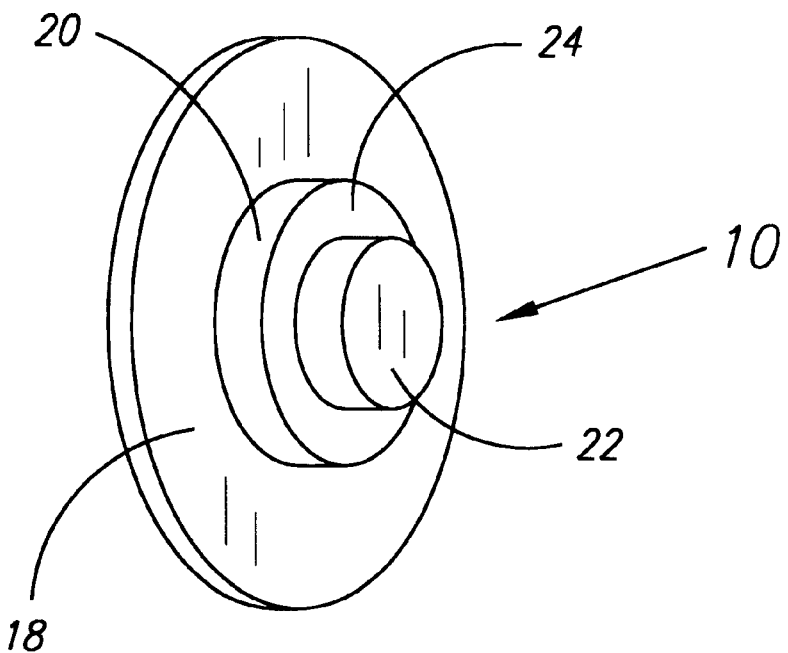
FIG. 1 is a locking device constructed in accordance with a preferred embodiment of the present invention.

Referring now to the drawings and initially to FIGS. 1 and 3, there is illustrated a preferred embodiment of the present invention. The invention is a locking device 10 for releasable securing a compact disc 12 to a disc seat 14 that is provided in a compact disc case 16. The case 16, as illustrated in FIG. 3, normally consists of an articulating lid 17 and a bottom 26.

The device 10 is preferably made as one piece, having a flat base 18, a raised circular shoulder 20 and a raised button 22 located on the top 24 of the circular shoulder 20. In use, the device 10 is placed between the bottom 26 of the case 16 and the disc seat 14 so that the base 18 rests against the bottom 26 of the case 16. When the device 10 is thus installed, the circular shoulder 20 of the device 10 inserts into a middle 28 of a central retaining ring 30 that is provided on the disc seat 14. Also, when the device 10 is installed, the button 22 extends upward through the center opening 32 of the central retaining ring 30.

A plurality of flexible teeth 34 comprise the central retaining ring 30. These teeth 34 must flex inward to allow a compact disc 12 to be inserted onto the central retaining ring 30, or alternately, to allow a compact disc 12 to be removed from the central retaining ring 30. With the circular shoulder 20 of the device 10 inserted into the middle 28 of the central retaining ring 30, the teeth 34 can not flex inward, and thus, the device 10 effectively locks the central retaining ring 30. This is illustrated in FIG. 4.

As illustrated in FIG. 5, the shoulder 20 of the device 10 must be pushed downward in order to unlock the central retaining ring 30. By pushing downward on the button 22, as illustrated by Arrow A, the shoulder 20 is moved downward sufficiently to allow the teeth 34 to once again flex inward. When the button 22 is pushed downward, the base 18 pushes against the bottom 26 of the case 16, causing the bottom 26 of the case 16 to flex downward sufficiently to allow the shoulder 20 of the device 10 to move downward out of the middle 28 of the central retaining ring 30. A compact disc 12 may be removed from the central retaining ring 30, as illustrated by Arrows B and C in FIG. 5, only while the button 22 is depressed and the device 10 is in its unlocked position. Likewise, a compact disc 12 may be re-inserted onto the central retaining ring 30 only while the button 22 is depressed and the device 10 is in its unlocked position.

As soon as the button 22 is released, the bottom 26 of the case 16 pushes the device 10 back into its normal upward position, as illustrated in FIG. 4. When the device 10 is in its normal upward position, the shoulder 20 re-inserts within the middle 28 of the central retaining ring 30, thereby re-locking the central retaining ring 30.

It is almost impossible to remove a compact disc 12 from a central retaining ring 30 that is locked by means of the device 10. Also, because of the position of the button 26 relative to a compact disc 12, the locking device 10 is essentially childproof. This is because, in order to remove the compact disc 12, one of the users hands must simultaneously push the button 22 and pull on the compact disc 12 while the user's other hand is occupied with holding onto the case 16. A child's hands are too small to be able to accomplish this maneuver.

Figure 2:
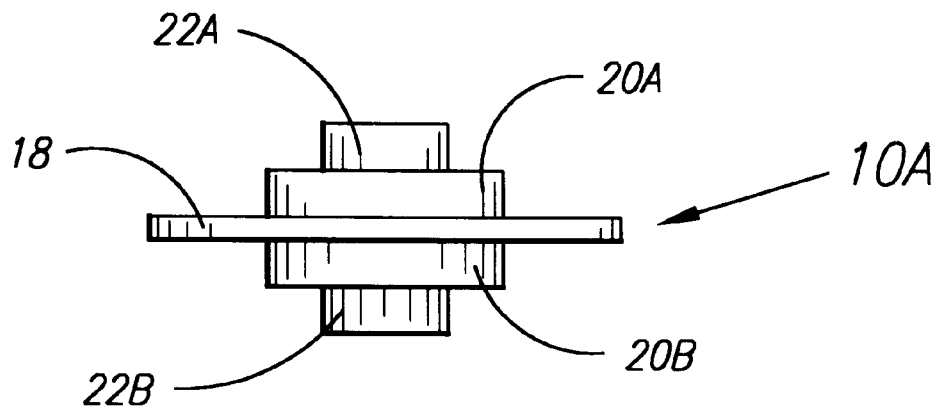
FIG. 2 is an alternate embodiment of the present invention for use with a compact disc case that holds multiple compact discs.
Figure 6:
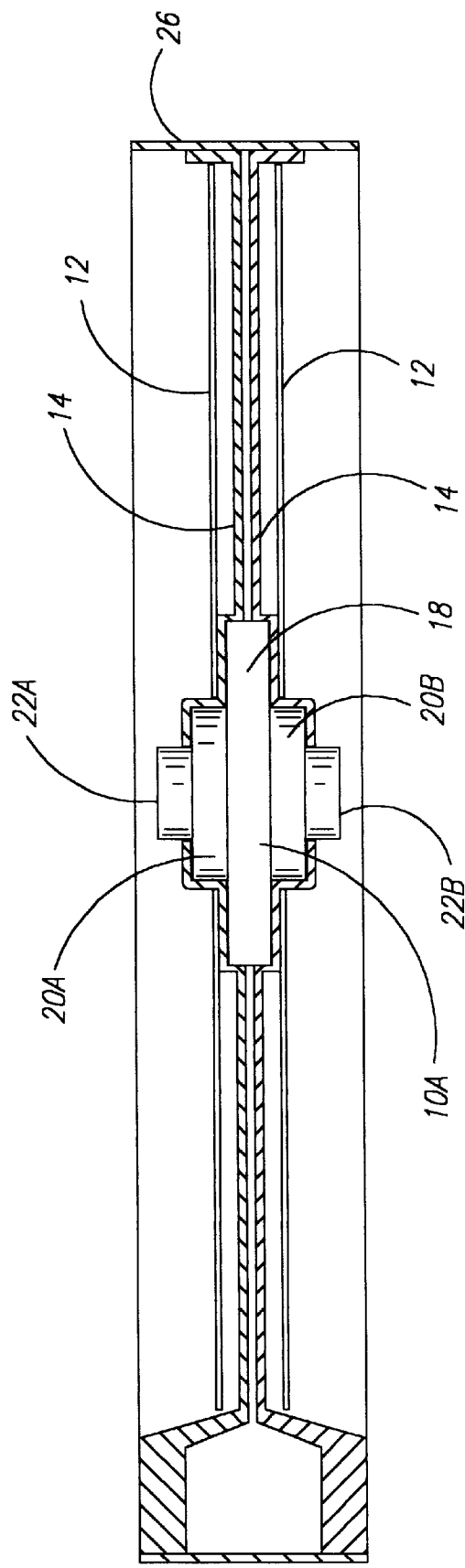
FIG. 6 is a cross sectional view of a compact disc case showing use of the locking device of FIG. 2.

Referring now to FIG. 2, an alternate embodiment locking device 10A is illustrated. The alternate locking device 10A is employed on compact disc cases (not) that hold multiple compact discs 12. These multiple disc compact disc cases (see FIG. 6) store compact discs 12 in a back to back fashion in a case with multiple leaves, similar to the leaves of a book. Each of the leaves of these multiple disc compact disc cases is comprised of a pair of disc seats 14 that are placed back to back with each other. One of the alternate locking devices 10A inserts between each pair of opposing disc seats. The alternate locking device 10A is simply a pair of locking devices 10 that have been placed base 18 to base 18 so that their buttons 22A and 22B face in opposite directions. In this configuration, when one of the buttons, 22A or 22B, is pushed, instead of the bottom 26 of the case 16 flexing, the opposing disc seat 14 flexes to allow the circular shoulder, 20A or 20B, to move to the unlocked position. Otherwise, the alternate locking device 10A functions essentially like the locking device 10.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A compact disc case with a locking device that inserts between a bottom of the compact disc case and a disc seat that is provided between the bottom of the compact disc case and a top of the compact disc case, the locking device comprising:

a flat base, a circular shoulder attached on one side of said base and extending upward therefrom, said circular shoulder inserts into a middle of a central retaining ring provided on said disc seat, a button attached on a top of said circular shoulder so that said button extends through a center opening of the central retaining ring proved on said disc seat, and said button being depressible relative to said central retaining ring to simultaneously disengage said button from said center opening and disengage said circular shoulder from said middle of said central retaining ring.

2. A compact disc case with a locking device in accordance with claim 1 wherein said base lies adjacent a bottom of the compact disc case.

3. A compact disc case with a locking device according to claim 1 wherein said base lies between said disc seat and a second disc seat that are in back to back relatinship with each other.

4. A compact disc case with a locking device, the locking device comprising:

a flat base mounted to a disc seat of said compact disc case, at least one shoulder sttached on a side of said base, and a button attached on each of said shoulder so that each said shoulder inserts into a middle of a corresponding central retaining ring provided on said disc seat and each said button extends through a center opening of the corresponding cental retaining ring, and each said button being depressible relative to its corresponding central retaining ring to simultaneously disengage said button from its corresponding center opening and disengage its corresponding shoulder from said middle of its corresponding central retaining ring.

5. A compact disc case with a lock according to claim 4 wherein two shoulders are provided, one on either side of opposite sides of said base.

6. A compact disc case with a lock according to claim 5 wherein two buttons are provided, one on each of said two shoulders.

* * * * *